Oct. 14, 1958    F. D. BEAL    2,855,795
MECHANISM CONTROLLER
Filed Jan. 7, 1955
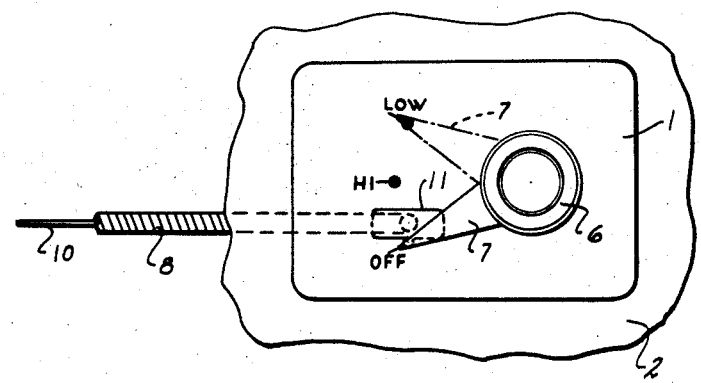
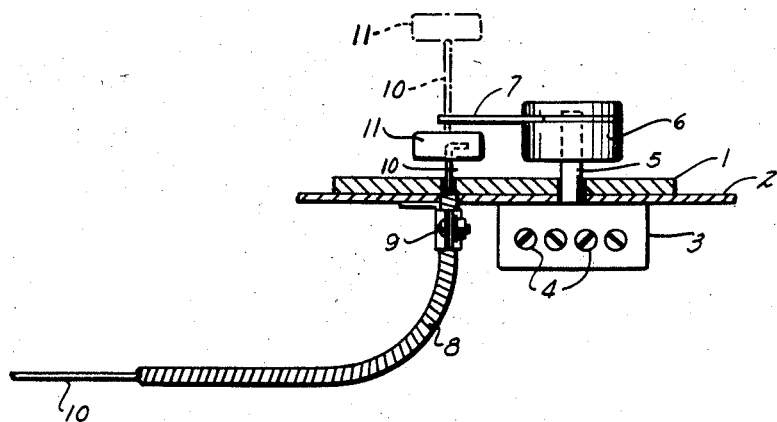
INVENTOR.
FREDERICK DAVID BEAL
BY
SMITH, OLSEN & KOTTS
ATTORNEYS

United States Patent Office 2,855,795
Patented Oct. 14, 1958

2,855,795

MECHANISM CONTROLLER

Frederick David Beal, Dearborn, Mich., assignor, by mesne assignments, to American Radiator & Standard Sanitary Corporation, New York, N. Y., a corporation of Delaware Application January 7, 1955, Serial No. 480,450

3 Claims. (Cl. 74—483)

This invention relates to controller mechanisms. One application of the invention is in the air conditioning field.

Most air conditioners employ a motor-operated fan or blower which operates in conjunction with an air damper. It is necessary in such air conditioners that when the fan is turned off the damper be closed to air flow. In many units the damper is controlled by an electric motor. When the fan motor is switched to the off position an electrical interlock between the fan motor switch and damper motor will cause the damper motor to automatically close the damper to air flow.

The use of the above-mentioned damper motor and electrical interlock is from an operational standpoint usually satisfactory. However, in certain installations this type of control mechanism is unsatisfactory because of space limitations and because of cost limitations.

Thus in many installations where it is necessary to provide a relatively compact and low cost unit it is unfeasible to provide a damper motor for controlling the position of the damper. Of course it has been known previously that the position of a damper could be controlled by manual means. However as far as is known the manual control means for the damper was not interlocked or interconnected with the fan motor switch. The result was that when a manual control means for the damper was employed the motor would sometimes be turned off and the damper inadvertently left open to air flow.

The present invention proposes to provide in one instance a simple, low cost control mechanism for a fan and damper wherein there are employed a pair of manually actuated control elements, one of which is to control operation of the fan motor, and the other of which is to control opening and closing of the damper. The control elements are so related to one another that the fan cannot be turned off until the damper is closed. Once the damper is closed it cannot again be opened while the fan is turned off.

In its broader aspects the invention can be employed wherever it is necessary to employ a plurality of control elements and it is desired to actuate the control elements in a certain predetermined order without the operator of the mechanism being able to actuate the elements in other than predetermined order.

One object of the invention is to provide a simple and economically constructed control mechanism for a fan motor and air damper.

Another object of the invention is to provide a manually actuated fan and damper control mechanism which is so constructed that the fan cannot be turned off until the damper has been closed.

Another object of the invention is to provide a manually actuated control mechanism comprising at least two manually actuated control elements of such construction that one of the control elements can be positioned to prevent inadvertent or undesired operation of another control element.

Another object of the invention is to provide a plurality of control elements of such construction that one control element must be actuated before its neighboring element, whereby to prevent the user from operating the elements in an undesired order.

Other objects of this invention will appear in the following description and appended claims, reference being had to the accompanying drawings forming a part of this specification wherein like reference characters designate corresponding parts in the several views.

In the drawings:

Figure 1 is a plan view of one embodiment of the invention.

Figure 2 is a view taken at right angles to Figure 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings the illustrated embodiment will be seen to include a face plate 1 fixedly secured on the outer surface of a casing wall 2. In the illustrated embodiment wall 2 is part of the casing for an air conditioner, although the invention is susceptible to use in other devices than air conditioners. A switch box 3 is mounted on the inner surface of wall 2, and is provided with a plurality of terminals 4 for putting the terminals of a fan motor (not shown) in electrical communication with a power source (not shown). Projecting from box 3 is a rotatable shaft 5 having its free end terminating in a manually-engageable knob 6. A pointer 7 is provided on knob 6 for correlating the position of said knob with the electrical condition of the switch and fan motor. Knob 6 and pointer 7 may be considered as a manually actuable element for controlling operation of the fan motor. In the illustrated position of pointer 7 the switch is off. Clockwise rotation of knob 6 will cause the fan motor to rotate at high and then low speeds.

Adjacent switch box 4 there is provided a flexible conduit 8 secured in place on wall 2 by means of a clamp 9. Within conduit 8 is a flexible wire 10 which leads from an air damper (not shown) to a manually-engageable knob 11.

In the full line position of knob 11 and wire 10 the damper is closed to air flow. In the dotted line position of knob 11 and wire 10 the damper will be opened to air flow. However, pointer 7 is in the path of knob 11 so that before the knob can be pulled to its dotted line position pointer 7 must be moved to actuate the fan motor. The result is that the damper can never be opened while the fan is idle. When pointer 7 has been moved to actuate the fan motor knob 11 can then be moved to its dotted line position whereby to open the damper. In its dotted line position the control element formed by knob 11 and wire 10 is located across the path of pointer 7, whereby the fan motor cannot be turned off until the damper is closed.

It will be understood that the relationship of parts (whereby one control element is positioned in the path of another control element so as to require the elements to be actuated in predetermined order) could be employed to control devices other than fan motors and air dampers.

Having thus described my invention, I claim:

1. An air delivery controller mechanism comprising a plate; a fan motor switch positioned on one face of said plate; a manually rotatable switch-actuating shaft projecting from the switch through the plate; a pointer carried on the free end of said shaft; indicia means on the face of the plate remote from the switch for indicating the "off" and "on" positions of the switch; a damper control element projecting through the plate at a point within the arc of the pointer for movement parallel to the axis of the shaft; a knob carried by the control element; said knob occupying a "damper closed" position between the pointer and plate and a "damper open" position above the pointer; said knob being of such dimension as to be in registry with the pointer only when said pointer is in the "off" position; whereby the fan cannot be turned off until the damper is closed, and the damper cannot be opened unless the fan is turned on.

2. An air delivery controller mechanism comprising a plate; a fan motor switch positioned on one face of said plate; a manually rotatable switch-actuating shaft projecting from the switch through the plate; a pointer carried by said shaft; indicia means on the face of the plate remote from the switch for indicating the condition of the switch; a damper control element projecting through the plate at a point within the arc of the pointer for movement parallel to the axis of the shaft; and a manually engageable element carried by the portion of the damper control element located on the face of the plate remote from the switch; the spacing between the pointer and plate being sufficient to accommodate the manually engageable element while permitting arcuate movement of the pointer.

3. An air delivery controller mechanism comprising a plate; a fan motor switch positioned on one face of said plate; a manually rotatable switch-actuating shaft projecting from the switch through the plate; a pointer carried on the free end of said shaft; indicia means on the face of the plate remote from the switch for indicating the condition of the switch; a flexible conduit having an end portion fixedly carried adjacent the switch; a flexible damper control element extending through said conduit and plate at a point within the arc of the pointer; and a manually engageable element carried by the damper control element for movement from a position within the space between the pointer and plate to a position above the pointer.

References Cited in the file of this patent

UNITED STATES PATENTS

| | | |
|---|---|---|
| 677,027 | Garrett | June 25, 1901 |
| 933,211 | Van Valkenburg | Sept. 7, 1909 |
| 1,091,733 | Cook | Mar. 31, 1914 |
| 1,309,797 | Deutsch | July 15, 1919 |
| 1,898,569 | Pearson | Feb. 21, 1933 |
| 2,015,834 | Banker | Oct. 1, 1935 |
| 2,144,135 | Zindel | Jan. 17, 1939 |
| 2,456,369 | Brustowsky | Dec. 14, 1948 |

FOREIGN PATENTS

| | | |
|---|---|---|
| 617,473 | Germany | Aug. 20, 1935 |